United States Patent
Nanduri et al.

(12)

(10) Patent No.: US 7,634,572 B2
(45) Date of Patent: Dec. 15, 2009

(54) BROWSER-PLUGIN BASED METHOD FOR ADVANCED HTTPS DATA PROCESSING

(75) Inventors: Akshay Nanduri, Waterloo (CA); Ajit Singh, Mississauga (CA); Salmaan Ahmed, Mississauga (CA); David Sze, Kitchener (CA)

(73) Assignee: Slipstream Data Inc., Waterloo, Onatrio (CA)

( * ) Notice: Subject to any disclaimer, the term of this patent is extended or adjusted under 35 U.S.C. 154(b) by 0 days.

(21) Appl. No.: 11/313,771

(22) Filed: Dec. 22, 2005

(65) Prior Publication Data

US 2006/0155869 A1 Jul. 13, 2006

Related U.S. Application Data

(60) Provisional application No. 60/637,767, filed on Dec. 22, 2004.

(51) Int. Cl.
*G06F 15/16* (2006.01)
(52) U.S. Cl. .................. 709/227; 709/219; 709/246
(58) Field of Classification Search ................ 709/219, 709/227, 246, 247
See application file for complete search history.

(56) References Cited

U.S. PATENT DOCUMENTS

| 6,604,106 | B1 * | 8/2003 | Bodin et al. ................ 709/203 |
| 6,654,807 | B2 | 11/2003 | Farber et al. |
| 6,658,006 | B1 | 12/2003 | Chen et al. |
| 6,981,195 | B2 | 12/2005 | Newcombe et al. |
| 2001/0029527 | A1 * | 10/2001 | Goshen ...................... 709/219 |
| 2002/0002636 | A1 | 1/2002 | Vange et al. |

(Continued)

FOREIGN PATENT DOCUMENTS

WO   2004043042   5/2004

(Continued)

OTHER PUBLICATIONS

A Freier, P. Karlton and P. Kocher, "Internet Draft: the SSL Protocol Version 3.0", Transport Layer Security Group, Nov. 1996.

(Continued)

*Primary Examiner*—Nathan J Flynn
*Assistant Examiner*—Michael E Keefer
(74) *Attorney, Agent, or Firm*—Bereskin & Parr LLP/S.E.N.C.R.L., s.r.l.

(57) ABSTRACT

Methods for custom processing of HTTPS data transmitted between a web browser and a web server are described. The methods comprise creating a custom request header by intercepting and modifying a HTTPS header. The modification indicates support for preselected customized processing operations. The method further comprises sending the custom request header with a HTTP request to a web server. The methods further comprise receiving processed payload data from the web server and a HTTP response header. The processed payload data is created by processing original payload data based on preselected customized processing operations. The web browser modifies the response header to create a modified response header, and the processed payload data using one or more of the customized processing operations. The modified payload data is provided to the web browser for use. The methods ensure that the web browser implements and executes the underlying channel set up and encryption operations.

14 Claims, 3 Drawing Sheets

U.S. PATENT DOCUMENTS

| | | | |
|---|---|---|---|
| 2002/0129137 | A1 | 9/2002 | Mills et al. |
| 2002/0129279 | A1* | 9/2002 | Spacey ........................ 713/201 |
| 2004/0010621 | A1* | 1/2004 | Afergan et al. .............. 709/247 |
| 2005/0278793 | A1 | 12/2005 | Raley et al. |
| 2006/0075398 | A1* | 4/2006 | Bennett et al. .............. 717/170 |
| 2008/0172396 | A1* | 7/2008 | Banerjee et al. ............... 707/10 |

FOREIGN PATENT DOCUMENTS

| | | |
|---|---|---|
| WO | 2004079497 | 9/2004 |

OTHER PUBLICATIONS

T. Dierks and C. Allen, "Request for Comments: 2246—The TLS Protocol", Network Working Group.

R. Fielding, J. Gettys, J. Mogul, H. Frystyk L. Masinter, P. Leach, and T. Berners-Lee, "Request for Comments: 2616, Hypertext Transfer Protocol—HTTP/1.1", Network Working Group, Jun. 1999.

E. Rescorla, "Request for Comments: 2818 HTTP over TLS" Network Working Group, May 2000.

J. Border, M. Kojo, J. Griner, G. Montenegro, and Z. Shelby, "Performance Enhancing Proxies Intended to Mitigate Link-Related Degradations" Request for Comments: 3135, Network Working Group, Jun. 2001.

International Search Report and Written Opinion, PCT/CA2006/000434, mailed Dec. 19, 2006.

Supplemental European Search Report, 06721701.8-2413.

Fielding et al.: "RFC 2616 Hypertext Transfer Protocol—HTTP/1.1 (part of)", Internet Citation, [online], Jun. 1999, XP002204677.

European Examination Report, 06 721 701.8-2413, mailed on Feb. 12, 2009.

* cited by examiner

Figure 1: Secure Interaction Between a Web-Browser and a Web-Server

Prior Art

BROWSER-PLUGIN BASED METHOD FOR ADVANCED HTTPS DATA PROCESSING

REFERENCE TO RELATED APPLICATION

This application claims priority from U.S. provisional application Ser. No. 60/637,767 filed on Dec. 22, 2004.

FIELD OF THE INVENTION

The present invention relates to a novel method of utilizing a browser plugin that provides a technique for interception and further processing, of data sent via the HTTPS protocol. The HTTPS protocol is defined as HTTP over a Secure Socket Layer (SSL), or HTTP over a Transport Layer Security (TLS). See A. Freier, P. Karlton and P. Kocher, "Internet-Draft: The SSL Protocol Version 3.0," *Transport Layer Security Group*, November 1996, for a discussion of SSL, and T. Dierks and C. Allen, "Request for Comments: 2246—The TLS Protocol," *Network Working Group*, January 1999 for a discussion of TLS A potential application of the subject method can be to apply proprietary data compression methods to reduce the volume of data communication of HTTPS payload data and also to possibly reduce the data transmission time. It should be noted that the option of applying proprietary data processing in this case is available in addition to standard built-in HTTPS compression and encoding approaches such as 'Content-Encoding' methods: gzip, compress, deflate, described in section 3.5 of the article entitled "Request for Comments; 2616, Hypertext Transfer Protocol—HTTP/1.1," *Network Working Group*, June 1999, by R. Fielding, J. Gettys, J. Mogul, H Frystyk, L. Masinter, P. Leach, and T. Berners-Lee.

BACKGROUND OF THE INVENTION

Presently, large volumes of data are delivered over the Internet by server computers to client computing devices such as desktop computers, laptops and various handheld digital devices using a communication protocol called 'Hyper Text Transfer Protocol' (HTTP). The HTTP protocol strictly defines the interaction between a client device that sends requests for data, and a server that supplies the data. A client, after sending the request for data to the server, waits for the server's response, and then normally, upon receipt of data, delivers the data to the end user. The server is usually implemented by a software component called a 'web-server'. In many cases, the client is implemented by a software component called a 'web-browser', which provides a user interface for the client to enable an end user to access and observe content (e.g. documents, images, audio files, etc.) available on the World-Wide Web in a rendered form. The web-browser interprets and renders HTML content for presentation to the user, accepts user input (e.g., mouse-clicks or keyboard strokes), and provides hyper-linking functionality. Web-browsers may also implement other functions such as rendering images, bookmarking, maintaining history lists for navigation, and caching. A web-browser may be included with a computer operating system and, as such, can be pre-installed on a computer along with the operating system (see, e.g., Microsoft Windows and Microsoft Internet Explorer). Additionally, as with other computer software, web-browsers may also be obtained for later installation by an end user (see, e.g. Netscape Navigator).

Rapid expansion in Internet usage by businesses, banking and direct consumer shopping led to the definition of a standard approach for sending encrypted HTTP data between HTTP clients and servers. This approach (also known as HTTPS) was first implemented by Netscape as HTTP over a Secure-Socket Layer (SSL) TCP/IP connection. The HTTPS protocol allowed end-users and corporations to safely send credit-card and other sensitive information over the internet. More specifically, it prevents eavesdropping, message forgery and tampering of HTTP data sent between client/server applications. The first implementations of HTTPS utilized 40-bit encryption while the latest standard (HTTP over TLS described in an article by E. Rescorla entitled "Request for Comments: 2818, HTTP over TLS," *Network Working Group*, May 2000), facilitates the use of powerful 128-bit encryption.

The underlying implementations of SSL and TLS are described in the article by A. Freier et al. and in the article by T. Dierks et al. respectively. Although the mechanisms are different, both SSL and TLS essentially involve several common stages:

1) Protocol version identification between web-browser and web-server.
2) Transmission of webserver's public key to the web-browser (the signed public key is also known as a Certificate).
3) Web-browser verifies the Certificate by communicating with a trusted entity (known as a Root Certificate Authority). This ensures that the web-browser is communicating with the intended web-server.
4) Negotiation and exchange of 'symmetric encryption-key' between web-browser and web-server.
5) The symmetric encryption-key is then used to establish an SSL or TLS 'channel' between the web-browser and web-server.
6) Encryption of all HTTP payload data between web-browser and web-server over the SSL/TLS channel.

It is imperative for SSL and TLS functionality to be implemented by the web-browser so that the SSL/TLS 'channel' is established directly from the web-browser. This guarantees the encryption and security of all HTTP data originating from the web-browser and received from the web-server. Reference is made to FIG. 1 which depicts the aforementioned scenario.

Now consider the compression of HTTPS data (HTTP payload data sent over an SSL or TLS channel) in order to reduce the volume of data transmission. Content-encoding methods inherently present in the HTTP standard (section 3.5 of the article by R. Fielding et al.) can be used to reduce the volume of data sent in HTTPS transactions. These methods consist of a class of lossless compression algorithms such as gzip, compress and deflate which can be supported within web-browsers and web-servers.

Unfortunately, custom approaches (e.g., proprietary data-compression) or any other proprietary or custom data processing cannot be supported by HTTPS. HTTPS does not provide for a standard interface or mechanism to facilitate custom data transformation. More specifically, the encryption of HTTP data actually randomizes the original source HTTP data. In an information-theoretic sense, the entropy of the encrypted data is significantly higher than the original source data. Significant randomization of source data limits the effectiveness of data-compression. The encrypted data also makes it difficult to do many other types of desirable data processing operations such as data recording, data monitoring, or data alteration. Since SSL and TLS are designed to prevent data-tampering or "man in the middle" viewing, retrieving the original source HTTP data is extremely difficult.

SUMMARY OF THE INVENTION

There are two distinct methods to implement the Browser-Plugin Method for Advanced HTTPS Data Processing of the subject invention (BPAHDP). In both cases, BPAHDP provides the option of conducting custom data processing operations including data compression, data encryption, or other types of data processing operations supported by the HTTP standard. Additionally, both BPAHDP methods ensure that the web-browser still implements and executes the underlying SSL/TLS channel setup and encryption operations. In both embodiments of BPAHDP, the most critical functionality is the ability to modify HTTP request/response headers and data sent over a TLS/SSL channel. In the regular HTTP case (HTTP over TCP) headers and data are sent as clear-text (i.e., as unencrypted data). Therefore, an HTTP proxy (an intermediary software entity that fetches HTTP data on behalf of a group of HTTP clients) component can intercept and modify header/data as it chooses—allowing custom data processing operations (including a custom compression operation) to be implemented. The subject of Performance Enhancing Proxies is discussed in a document (Request for Comments 3135, Network Working Group, June 2001) by J. Border, M. Kojo, J. Griner, G. Montenegro, and Z. Shelby, entitled, "Performance Enhancing Proxies Intended to Mitigate Link-Related Degradations". For HTTPS traffic, the data leaving a web-browser is encrypted. Therefore, a proxy cannot modify encrypted data, hence the novelty of the BPAHDP methodology. Both BPAHDP methods require specific implementation methods. In particular, both embodiments of BPAHDP require specific techniques to facilitate the use of Microsoft Internet Explorer™ as a BPAHDP enabled web-browser. Microsoft COM (Component Object Model) interfaces and Microsoft Internet Explorer's™ Pluggable Protocol capabilities are utilized to meet all requirements of both BPAHDP embodiments.

In one embodiment, there is provided a method for custom processing of HTTPS data comprising the steps of creating a HTTPS request at a web browser, wherein the customized web browser supports one or more preselected customized processing operations and has an end user interface for accessing and rendering content on the World-Wide Web, and the HTTPS request comprises a request header to be transmitted to a web server; intercepting the HTTPS request at the customized web browser, before the HTTPS request is encrypted, and modifying the HTTPS request header to create a custom request header indicating that the customized web browser supports the one or more preselected customized processing operations; and encrypting and sending the custom request header and the HTTPS request to the web server.

In another embodiment, there is provided a method for custom processing of HTTPS data comprising the steps of creating a HTTPS request at a customized web browser, wherein the customized web browser supports one or more preselected customized processing operations and has an end user interface for accessing and rendering content on the World-Wide Web, and the HTTPS request comprises a request header to be transmitted to a web server; intercepting the HTTPS request at the customized web browser, before the HTTPS request is encrypted, and modifying the HTTPS request header to create a custom request header indicating that the customized web browser supports the one or more preselected customized processing operations; encrypting and sending the custom request header with the HTTPS request to the web server; at the web server, determining from the custom request header which of the one or more preselected customized processing operations are supported by the customized web browser; at the customized web browser, receiving from the web server processed payload data and a HTTPS response header correlatable therewith wherein the processed payload data is created by processing original payload data using the one or more customized processing operations supported by the customized web browser; and modifying the processed payload data utilizing the one or more preselected customized processing operations indicated in the HTTPS response header to create modified payload data indicative of the original payload data and providing the modified payload data to the customized web browser for further processing.

In some embodiments, there is provided a computer readable medium enabled for customized processing of HTTPS data, comprising means for performing the steps of creating a HTTPS request at a customized web browser, wherein the customized web browser supports one or more preselected customized processing operations and has an end user interface for accessing and rendering content on the World-Wide Web, and the HTTPS request comprises a request header to be transmitted to a web server; intercepting the HTTPS request at the customized web browser, before the HTTPS request is encrypted, and modifying the HTTPS request header to create a custom request header indicating that the customized web browser supports the one or more preselected customized processing operations; encrypting and sending the custom request header with the HTTPS request to a web server; at the web server, determining from the custom request header which of the one or more preselected customized processing operations are supported by the customized web browser; at the customized web browser, receiving from the web server payload data and a HTTPS response header correlatable therewith, wherein the processed payload data is created by processing original payload data using the one or more preselected customized processing operations supported by the customized web browser; and modifying the processed payload data utilizing the one or more preselected customized processing operations indicated in the HTTPS response header to create modified payload data indicative of the original payload data to be used for further processing.

In still other embodiments, there is provided a method for custom processing of HTTPS data comprising providing a web browser plug-in stored upon a computer readable medium for enabling a web browser to perform the steps of intercepting and modifying an outgoing request header at a web browser plug-in to create a custom request header, wherein the web browser plug-in supports one or more preselected customized processing operations and the custom request header indicates that the customized web browser supports the one or more preselected customized processing operations; sending the custom request header with a HTTPS request to a web server; receiving from the web server processed payload data and a HTTPS response header correlatable therewith, wherein the processed payload data is created by the web server by processing original payload data utilizing the one or more preselected customized processing operations indicated in the custom request header to be supported by the customized web browser; modifying the processed payload data utilizing the one or more preselected customized processing operations indicated in the response header to create modified payload data indicative of the original payload data modifying the response header to create a modified response header; and presenting the modified header and the modified payload data to the customized web browser for further processing.

In yet another embodiment, there is provided a computer program product for use on a computer system for customized processing of HTTPS data, the computer program product comprising a recording medium for recording means for instructing the computer system to perform the steps of creating a HTTPS request at a web browser wherein the customized web browser supports one or more preselected customized processing operations and has an end user interface for accessing and rendering content on the World-Wide Web, and the HTTPS request comprises a request header to be transmitted to a web server; intercepting the HTTPS request at the customized web browser, before the HTTPS request is encrypted, and modifying the HTTPS request header to create a custom request header indicating that the customized web browser supports one or more preselected customized processing operations; and encrypting and sending the custom request header and the HTTPS request to the web server.

In one embodiment, there is described a method for providing modified HTTPS processing capabilities, the method comprising providing a plug-in for installation in a customized web browser, wherein the plug-in is stored on a computer-readable medium and comprises programming instructions for performing one or more preselected customized processing operations; intercepting HTTPS requests created by the customized web browser before the HTTPS requests are encrypted; modifying the HTTPS request headers to create custom request headers that indicate that the customized web browser supports the one or more preselected customized processing operations; and providing the custom request headers to the customized web browser for encryption and transmission and further processing steps.

DETAILED DESCRIPTION OF THE INVENTION

Embodiment of BPAHDP Method '1'

Define WSA as a BPAHDP enabled web-server (a web-server that has implemented 'Advanced Processing' or custom data processing of HTTP payload data) that is able to accept HTTPS connections from standard web-browsers. In addition, define WBA as a web-browser that has implemented the following functionality required by BPAHDP, and is thus BPAHDP enabled:

1) The ability to add custom headers on all outgoing HTTP requests sent over an SSL/TLS channel. For example:
GET http://www.slipstream.com HTTP/1.0\r\n
Connection: Close\r\n
\r\n
is modified to:
GET http://www.slipstream.com HTTP/1.0\r\n
Connection: Close\r\n
X-BPAHDP: <control_info>\r\n
\r\n 2) The presence of the X-BPAHDP header identifies WBA as being BPAHDP enabled. The 'control_info' field is utilized to identify the BPAHDP version (identifying the supported data processing operations present in the web-browser) and any other relevant control information required during the custom data processing operation.

3) The ability to read and modify the HTTP response header returned by WSA over the TLS/SSL channel. For example:
HTTP/1.0 200 OK\r\n
Content-Type: text/xml\r\n
Content-Length: 300\r\n
X-BPAHDP: <control_info>\r\n
\r\n might be modified to:
HTTP/1.0 200 OK\r\n
Content-Type: text/html\r\n
Content-Length: 200\r\n
\r\n Since BPAHDP facilitates data transformation and filtering, the modification of certain HTTP headers (Content-Type and Content-Length) may be required. Additionally, certain response headers may need to be parsed and stored by the BPAHDP filtering method (in the above example <control_info> may be used during the decompression or some other data processing operation).

4) The ability to read and modify the HTTP payload data returned by WSA over an SSL/TLS channel. For example:
HTTP/1.0 200 OK\r\n
Content-Type: text/plain\r\n
Content-Length: 16\r\n
X-BPAHDP: <control_info>\r\n
\r\n
"This is a test"

may be modified to
HTTP/1.0 200 OK\r\n
Content-Type: text/plain \r\n
Content-Length: 20\r\n
\r\n
"This is not a test"

5) The BPAHDP enabled web-browser must be able to communicate with other non-BPAHDP enabled web-servers for both HTTP and HTTPS data.

System Architecture and Operation of the Method '1'

Figure 1:
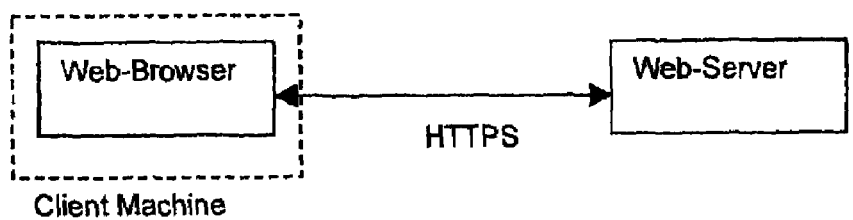
FIG. 1 is a diagram depicting a SSL/TLS channel between a web-browser and a web-server.
Figure 2:
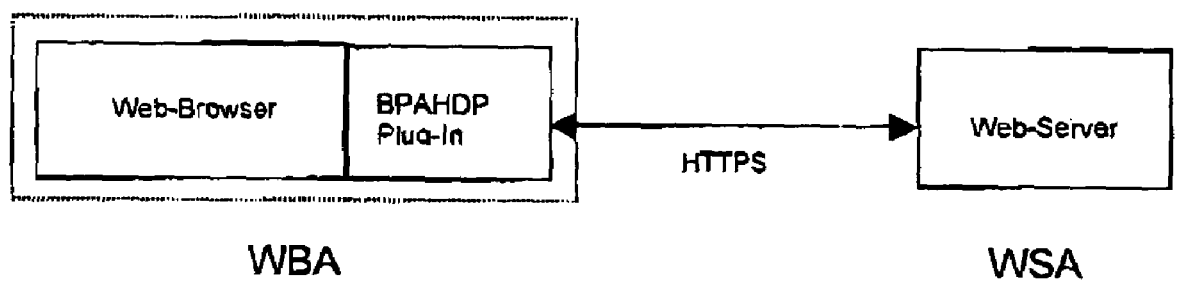
FIG. 2 is a diagram depicting the block level architecture for implementing Method '1' described in this document.

This subsection describes the block level architecture and operational method for carrying out custom data processing on HTTPS data based on the capabilities described earlier in Method '1'. The terms WBA and WSA in this subsection have the same definition as given in Method '1'. In the method described in this subsection, the HTTP based data exchange between WBA and WSA takes place over a SSL/TLS channel. Block level architectural diagram depicting the operation is given in FIG. 2.

1) The BPAHDP enabled web-browser (WBA) is used to modify the outgoing HTTP request headers to indicate to the BPAHDP enabled web-server (WSA) that the requesting WBA is capable of carrying out certain custom data processing (e.g. ability to decompress data that is compressed using a certain data compression algorithm called 'X')

2) If the WSA receives the indication from a WBA about being BPAHDP enabled and its associated capabilities, the WSA sends the HTTP response data to WBA in a form that can only be processed by a WBA that possesses the indicated capabilities. For example, if the WBA indicated that it is capable of decompressing data that has been compressed using a certain data compression algorithm called 'X', then WSA compresses its HTTP payload data using the algorithm 'X'. If the WSA does not receive any such indication or if the WSA is not BPAHDP enabled then WSA sends its HTTP response in the usual manner intended for a normal web-browser and without using the algorithm 'X'.
3) The ability of WBA to modify HTTP response headers and payload is used by the WBA to intercept the HTTP response headers and data and apply the custom data processing operation and present it to the web-browser in a format that is acceptable to a normal web-browser.

Embodiment of BPAHDP Method '2'

Define WSA as a BPAHDP enabled web-server (a web-server that has implemented 'Advanced Data Processing' or custom data processing of HTTP payload data) and is able to accept HTTPS connections from standard web-browsers. Also define CS as a standard HTTP/HTTPS web-server that provides the HTTP content to WSA.

The BPAHDP enabled web-server (WSA) meets the following requirements:
1) Ability to communicate with the CS via HTTP or HTTPS.
2) Executes the compression or filtering operation on HTTP payload data.
3) Can receive and accept HTTPS requests from WBA or from non-BPAHDP enabled web-browsers.

In addition, define WBA as a web-browser that has implemented the following functionality required by BPAHDP,
1) The ability to add custom headers on all outgoing HTTP requests sent over an SSL/TLS channel. For example:
GET http://www.slipstream.com HTTP/1.0\r\n
Connection: Close\r\n
\r\n
is modified to:
GET http://www.slipstream.com HTTP/1.0\r\n
Connection: Close\r\n
X-BPAHDP: <control_info>\r\n
\r\n
2) The presence of the X-BPAHDP header identifies WBA as being BPAHDP enabled. The <control_info> field is utilized to identify the BPAHDP version (identifying the supported custom data processing operations present in the web-browser) and any other relevant control information used during the data processing operations.
3) The ability to read and modify the HTTP response header returned by WSA over the TLS/SSL channel, For example:
HTTP/1.0 200 OK\r\n
Content-Type: text/xml\r\n
Content-Length: 300\r\n
X-BPAHDP: <control_info>\r\n
\r\n
may be modified to:
HTTP/1.0 200 OK\r\n
Content-Type: text/html\r\n
Content-Length: 200\r\n
\r\n
Since BPAHDP facilitates data transformation and filtering, the modification of certain HTTP headers (Content-Type and Content-Length) may be required. Additionally, certain response headers may need to be parsed and stored by the BPADPH filtering method (in the above example <control_info> may be used during the decompression or filtering operation).
4) The ability to read and modify the HTTP payload data returned y WSA over an SSL/TLS channel. For example:
HTTP/1.0 200 OK\r\n
Content-Type: text/plain\r\n
Content-Length: 16\r\n
X-BPACH: <control_info>\r\n
\r\n
"This is a lest"
may be modified to
HTTP/1.0 200 OK\r\n
Content-Type; text/plain \r\n
Content-Length: 20\r\n
\r\n
"This is not a test"
5) The ability to modify the HTTP URL (Uniform Resource Locator) of objects originally destined for the CS. For example, in order to route all HTTP requests to WSA:
GET http://www.slipstream.com HTTP/1.0\r\n
Connection: Close\r\n
\r\n
is modified to:
GET http://www.slipstreamWSA.com HTTP/1.0\r\n
Connection: Close\r\n
X-BPAHDP: <control_info>\r\n
\r\n
6) The BPAHDP enabled web-browser must be able to communicate with other non-BPAHDP enabled web-servers for both HTTP and HTTPS data.

Figure 3:
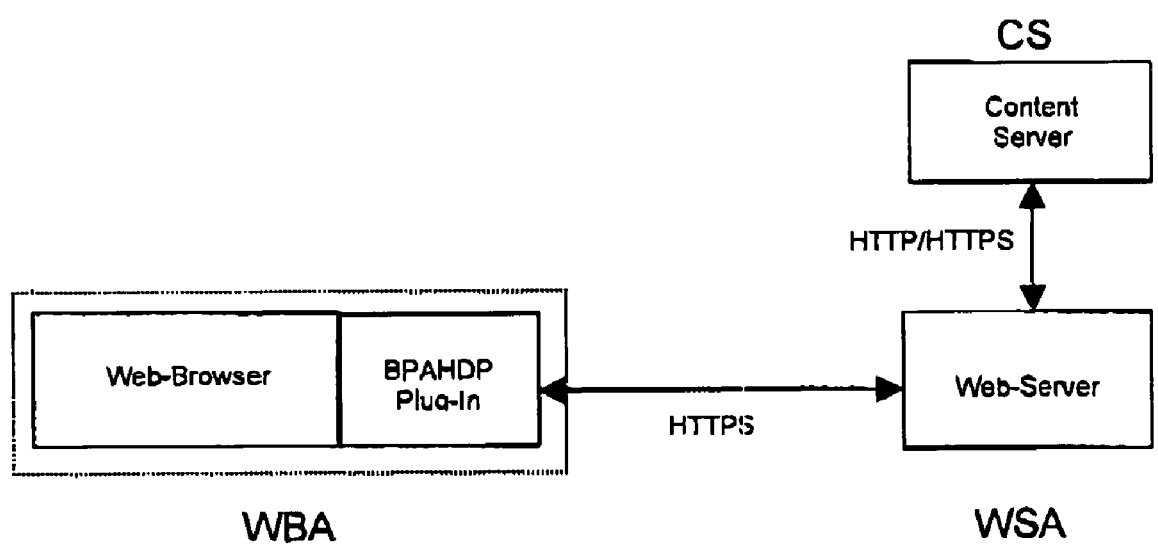
FIG. 3 is a diagram depicting the block level architecture for implementing Method '2' described in this document.

System Architecture and Operation of the Method '2':

In certain situations, it may not be possible to enable the target content server (CS) with the custom data processing capability required for BPAHDP. In that case, the HTTPS request originally intended for CS can be redirected to another server (WSA) that is enabled with custom data processing expected by a BPAHDP-enabled web-browser (WBA). This subsection describes the system architecture and operational method for carrying out custom data processing on HTTPS data based on the capabilities described earlier in Method '2'. The terms CS, WBA and WSA in this subsection have the same definition as given in Method '2'. In the method described in this subsection, the HTTP based data exchange between WBA and WSA takes place over a SSL/TLS channel. The use of SSL/TLS channel for the HTTP based data exchange between WSA and CS is optional. System architecture depicting the operation of the method is given in FIG. 3.
1) The ability to modify the outgoing URL in Method '2' is used by WBA to divert a HTTP request over SSL/TLS channel originally directed to a content-server CS to another web-server WSA that is enabled with the data processing capabilities expected by a BPAHDP enabled web browser in Method '2'.
2) The BPAHDP enabled web-browser modifies the outgoing HTTP request headers over SSL/TLS channel to indicate to the WSA that the requesting WBA is capable of carrying out certain custom data processing (e.g. ability to decompress data that is compressed using an algorithm called X) WBA also specifies the URL of the requested data at content server CS.
3) WSA receives the request from the WBA over SSL/TLS channel and makes a request to the content server CS for the response data required by WBA using HTTP or HTTPS and receives the response data from the content server CS.
4) Based on the indication from the requesting WBA about its capabilities, the WSA sends the HTTP response data over SSL/TLS channel to the WBA in a form that can only be processed by a WBA that possesses the indicated capabilities. For example, if the WBA indicated that it is capable of decompressing data that has been compressed using a data compression algorithm called 'X', then WSA compresses is HTTP payload data to be sent over SSL/TLS channel using the algorithm 'X'. If the WSA does not receive any such indication then WSA sends its HTTP response over SSL/TLS channel for a normal web-browser that may not be BPAHDP enabled.

5) The ability of WBA to modify HTTP response headers and payload over SSL/TLS channel is used by the WBA to intercept the HTTP response headers and data and apply the custom data processing operation and present it to the web-browser in a format that is acceptable to a normal web-browser.

Implementation of Custom Data Processing Using BPAHDP Method

Implementation of BPAHDP capabilities on the server side to realize a WSA, required for Method 1 or Method 2, can be done in two ways: (1) Implementation of a custom web server that implements the specified capabilities, (2) Via implementation of server-side plug-in supported by several web-servers.

On the client side, the exact strategy used for implementing Method 1 and Method '2', is dependent on the Application Programmers' Interface (API) of the web browser product that is used for implementation. There are two distinct strategies for the implementation depending on the situation:

(a) This strategy is applicable in the case where the source code of the web-browser is available. In this case, intercepting outgoing HTTP requests, incoming HTTP response headers, HTTP payload data, is a straightforward programming task. The interception and modification takes place after the browser has prepared the HTTPS GET request but before the request data has been encrypted. After interception, the modifications required by Method '1' or Method '2', as the case may be, can be applied.

(b) For some web browsers, access to the source code may not be available. In such cases, the available Application Programmers' Interfaces (APIs) are to be used. The following subsection describes the APIs for Microsoft's Internet Explorer versions 4.0 and up-to the versions released to-date that can be used for implementing Method '1' and Method '2'.

Embodiment of BPAHDP Methods in Microsoft Internet Explorer™

Define COM as Microsoft Component Object Model—Microsoft's implementation of interconnecting software objects via Remote Procedure Calls (RPC), function parameter marshalling and automation. Define IE as Microsoft Internet Explorer™ versions 4.0 and above. Define a Pluggable Protocol as a COM object that can override IE's handling of specific web schema. For example, an "http://" Pluggable Protocol can override a complete "http://" transaction that is normally carried out by IE.

The aforementioned requirements of BPAHDP can be met in IE by novel use of the COM interfaces exposed by Internet Explorer™ (IE). Use of these interfaces facilitate the modification of HTTP request headers, modification of HTTP response headers, modification of HTTP response data as well as URL link translation. Define the BPAHDP-PP as a COM object contained in a dynamic-linked library (DLL). The BPAHDP-PP is registered as an "https" Pluggable Protocol and implements all of core BPAHDP functionality (header modification, data processing, URL translation).

The following steps are followed to implement BPAHDP functionality in Microsoft Internet Explorer™ (IE):

1) Create a COM object that implements the IInternetProtocol, IInternetProtocolRoot and IHttpNegotiate interfaces. This COM object is the BPAHDP-PP.

2) Register the COM object as a Pluggable Protocol for the "https" protocol. This is accomplished by placing the unique identifier (GUID) of the BPAHDP-PP in the Microsoft Windows registry key—HKEY_CLASSES_ROOT\PROTOCOLS\Name-Space Handler\https.

3) In the BPAHDP-PP, utilize the IInternetProtocolRoot::Start method to implement the URL link translation requirement of BPAHDP. For example, in Method-2 of BPAHDP, the URL requested by the IE web-browser may be modified from www.slipstreamCS.com to www.slipstreamWSA.com. The original URL to fetch is passed as a function parameter to IInternetProtocolRoot::Start. Hence, the actual URL fetched can be modified by the BPAHDP-PP, which provides the function implementation of IInternetProtocolRoot::Start.

4) In the BPAHDP-PP, utilize the IHttpNegotiate::BeginningTransaction method to modify the outgoing HTTP request header sent over the SSL/TLS channel. The HTTP request header should be modified such that the IE web-browser is identified as being BPAHDP enabled. For example, GET http://www.slipstreamWSA.com HTTP/1.0\r\n
Connection: Close\r\n
\r\n is modified to:

GET http://ww.slipstreamWSA.com HTTP/1.0\r\n
Connection: Close\r\n
X-BPAHDP: <control_info:>\r\n
\r\n The 'pszAdditionalHeaders' function parameter (a reference parameter) in IHttpNegotiate::BeginningTransaction is modified by the BPAHDP-PP to contain any custom HTTP headers to add in the outbound HTTP request.

5) In the BPAHDP-PP, utilize the IHttpNegotiate::OnResponse method to modify the incoming HTTP response header received over the SSL/TLS channel. The response header may be modified to reflect the specific data filtering operation that is implemented. The operation may change the MIME-type (content-type) of the data, as well as the aggregate content length. Moreover, the response header may contain specific control information for the filtering operation implemented in BPAHDP-PP. For example, HTTP/1.0 200 OK\r\n
Content-Type: text/plain\r\n
Content-Length: 16\r\n
X-BPACH: <control_info>\r\n
\r\n
"This is a test"

may be modified to:

HTTP/1.0 200 OK\r\n
Content-Type: text/plain \r\n
Content-Length: 20\r\n
\r\n
"This is not a test"

The 'szReponseHeaders' function parameter in IHttpNegotiate::OnResponse contains the entire HTTP response header returned by the BPAHDP enabled web-server. The 'szReponseHeaders' parameter can also be completely re-written by the BPAHDP-PP to contain a new HTTP response header.

6) The IInternetProtocol::Read method is called when the IE web-browser requests unfiltered (or decoded) data to be returned by the BPAHDP-PP. Data is written to a fixed-length buffer function parameter named 'pv', and the length of the unfiltered data is written passed back in the reference parameter 'pcbRead'.

It should be recognized that the embodiments described herein and shown in the drawing figures are meant to be illustrative only and should not be taken as limiting the scope of invention. Those skilled in the art will recognize that the elements of the illustrated embodiments can be modified in arrangement and detail without departing from the spirit of the invention. Therefore, the invention as described herein contemplates all such embodiments and modified embodiments as may come within the scope of the following claims or equivalents thereof.

The invention claimed is:

1. A method for custom processing of HTTPS data, comprising the steps of:
   a) creating a HTTPS request at a customized web browser, wherein the customized web browser supports one or more preselected customized processing operations and has an end user interface for accessing and rendering content on the World-Wide Web, and the HTTPS request comprises one or more request headers to be transmitted to a web server;
   b) intercepting the HTTPS request at the customized web browser, before the HTTPS request is encrypted, and modifying the HTTPS request to add a custom request header indicating that the customized web browser supports the one or more preselected customized processing operations;
   c) encrypting and sending the custom request header and the HTTPS request to the web server;
   d) receiving and decrypting the HTTPS request and the custom request header at the web server;
   e) creating a HTTPS response comprising processed payload data and one or more HTTPS response headers correlatable therewith, wherein the processed payload data is created based on the HTTPS request by processing original payload data using the one or more preselected customized processing operations indicated in the custom request header to be supported by the customized web browser; and
   f) encrypting and sending the HTTPS response from the web server to the customized web browser.

2. The method of claim 1, further comprising the step of modifying a URL of an object to be fetched by the customized web browser.

3. The method of claim 2, wherein the object is a web site address for a content server.

4. The method of claim 1, wherein the HTTPS request is transmitted over the secure communication channel which is a Secure Socket Layer (SSL) connection or Transport Layer Security (TLS) connection.

5. The method of claim 1, wherein the customized web browser is a preinstalled web browser enhanced by a web browser plug-in to support the one or more preselected customized processing operations.

6. The method of claim 1, wherein the preselected customized processing operations comprise, or are selected from the group comprising: a compression operation, a decompression operation, an encryption operation, and a decryption operation.

7. The method of claim 1 further comprising the steps of:
   g) receiving and decrypting the HTTPS response from the web server at the customized web browser;
   h) modifying the processed payload data utilizing the one or more preselected customized processing operations indicated in the one or more HTTPS response headers to create modified payload data indicative of the original payload data;
   i) modifying the HTTPS response to form a modified response, wherein the one or more HTTPS response headers are modified in the modified response to form one or more modified response headers corresponding to the original payload data; and
   j) providing the modified response and the modified payload data to the customized web browser for further processing.

8. The method of claim 1, wherein the customized web browser is enhanced prior to installation to support the one or more preselected customized processing operations.

9. A computer readable storage medium having computer readable program code stored therein, the computer readable program code adapted to cause a customized web browser to perform the steps of:
   a) creating a HTTPS request at a customized web browser, wherein the customized web browser supports one or more preselected customized processing operations and has an end user interface for accessing and rendering content on the World-Wide Web, and the HTTPS request comprises one or more request headers to be transmitted to a web server;
   b) intercepting the HTTPS request at the customized web browser, before the HTTPS request is encrypted, and modifying the HTTPS request to add a custom request header indicating that the customized web browser supports the one or more preselected customized processing operations;
   c) encrypting and sending the custom request header with the HTTPS request to a web server;
   d) receiving from the web server and decrypting a HTTPS response comprising processed payload data and one or more HTTPS response headers correlatable therewith, wherein the processed payload data is created by the web server based on the HTTPS request by processing original payload data using the one or more preselected customized processing operations indicated in the custom request header to be supported by the customized web browser;
   e) modifying the processed payload data utilizing the one or more preselected customized processing operations indicated in the one or more HTTPS response headers to create modified payload data indicative of the original payload data to be used for further processing;
   f) modifying the HTTPS response to form a modified response, wherein the one or more HTTPS response headers are modified in the modified response to form one or more modified response headers corresponding to the original payload data; and
   g) providing the modified response and the modified payload data to the customized web browser for further processing.

10. The computer readable storage medium of claim 9, further comprising the step of modifying a URL of an object to be fetched by the customized web browser over a secure communication channel.

11. The computer readable storage medium of claim 9, wherein the HTTPS request is transmitted over a secure communication channel which is a Secure Socket Layer (SSL) connection or a Transport Layer Security (TLS) connection.

12. The computer readable storage medium of claim 9, wherein the preselected customized processing operations comprise, or are selected from the group comprising: a compression operation, a decompression operation, an encryption operation, and a decryption operation.

13. The computer readable storage medium of claim 9, wherein the computer readable program code comprises a web browser plug-in.

14. A client-server system for custom processing of HTTPS data, comprising:

a client computing device for executing a customized web browser, wherein the customized web browser supports one or more preselected customized processing operations and has an end user interface for accessing and rendering content on the World-Wide Web, and the customized web browser is operable to:
  a) create a HTTPS request, wherein the HTTPS request comprises one or more request headers to be transmitted to a web server
  b) intercept the HTTPS request, before the HTTPS request is encrypted, and modify the HTTPS request to add a custom request header indicating that the customized web browser supports the one or more preselected customized processing operations;
  c) encrypt and send the custom request header with the HTTPS request to a web server;
  d) receive from the web server and decrypt a HTTPS response comprising processed payload data and one or more HTTPS response headers correlatable therewith, wherein the processed payload data is created based on the HTTPS request by processing original payload data using the one or more preselected customized processing operations indicated in the custom request header to be supported by the customized web browser;
  e) modify the processed payload data utilizing the one or more preselected customized processing operations indicated in the one or more HTTPS response headers to create modified payload data indicative of the original payload data to be used for further processing;
  f) modify the HTTPS response to form a modified response, wherein the one or more HTTPS response headers are modified in the modified response to form one or more modified response headers corresponding to the original payload data;
  g) perform further processing on the modified response and the modified payload data; and a server computer for executing a web server operable to:
  A) receive and decrypt the HTTPS request and the custom request;
  B) create the HTTPS response comprising the processed payload data and the one or more HTTPS response headers correlatable therewith; and
  C) encrypt and send the HTTPS response to the customized web browser.

* * * * *